(12) United States Patent
Graf et al.

(10) Patent No.: US 7,016,355 B1
(45) Date of Patent: Mar. 21, 2006

(54) DETERMINATION OF THE PROPAGATION DELAY IN A PACKET SWITCHED NETWORK

(75) Inventors: Leslie Graf, Balwyn (AU); Christian Groves, Newport (AU); Ian Rytina, Carlton (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/830,430

(22) PCT Filed: Oct. 26, 1999

(86) PCT No.: PCT/EP99/08067

§ 371 (c)(1),
(2), (4) Date: Sep. 20, 2001

(87) PCT Pub. No.: WO00/25487

PCT Pub. Date: May 4, 2000

(30) Foreign Application Priority Data

Oct. 26, 1999 (EP) .................... PCT/EP99/08067

(51) Int. Cl.
*H04L 12/28* (2006.01)
*H04L 12/66* (2006.01)
*H04B 3/20* (2006.01)

(52) U.S. Cl. ............... 370/395.21; 370/352; 370/401; 370/286

(58) Field of Classification Search ............... 370/493, 370/352, 401, 519, 285, 279, 410, 286; 709/223, 709/224, 250; 379/34, 134, 219
See application file for complete search history.

(56) References Cited

U.S. PATENT DOCUMENTS

| 5,477,531 A | | 12/1995 | McKee et al. |
| 5,555,295 A | * | 9/1996 | Bhusri .................... 379/112.09 |
| 5,627,766 A | | 5/1997 | Beaven |
| 5,781,554 A | | 7/1998 | Organ |
| 5,857,009 A | * | 1/1999 | Handig ..................... 379/32.01 |
| 5,870,540 A | * | 2/1999 | Wang et al. .................. 714/43 |
| 5,959,974 A | * | 9/1999 | Badt et al. .................. 370/233 |
| 6,560,648 B1 | * | 5/2003 | Dunn et al. ................. 709/224 |

FOREIGN PATENT DOCUMENTS

| EP | 0905959 A2 PX | 3/1999 |
| WO | WO97/26763 Y | 7/1997 |
| WO | WO97/28628 A | 8/1997 |
| WO | WO97/38511 A | 10/1997 |

* cited by examiner

*Primary Examiner*—Hanh Nguyen
(74) *Attorney, Agent, or Firm*—Roger Burleigh

(57) ABSTRACT

A method of determining the propagation delay over a packet switched network intented to provide a segment of a telephone circuit. In response to a request for a telephone circuit between two subscribers, a packet containing an echo request message is transmitted over the packet switched network from a first network node to a second network node. The second network node reacts to receipt of the echo request message by transmitting a packet containing an echo reply message to the first network node. The first network node then determines the round trip propagation delay for the packet switched network segment on the basis of the time which elapses between sending the echo request message from the first node and receiving the echo reply message also at the first node.

4 Claims, 1 Drawing Sheet

DETERMINATION OF THE PROPAGATION DELAY IN A PACKET SWITCHED NETWORK

FIELD OF THE INVENTION

The present invention relates to packet switched networks and more particularly to the transmission of real time voice and data information over a packet switched network.

BACKGROUND OF THE INVENTION

Conventional telecommunications networks for conveying voice and other user information have in general relied upon dedicated telecommunications network infrastructure and transmission protocols. However, with the recent explosive growth in digital data transmission, driven in particular by the use of intranets and the Internet, there has been a move towards the use of more generic infrastructure and transmission protocols in the telecommunications industry. This move is driven primarily by the desire for interoperability between telecommunications networks and other data networks, and secondarily by the cost and performance advantages which general data network systems offer over conventional telecommunications systems.

There exist proposals for the replacement of certain parts of telecommunications networks with packet switched networks and in particular with Internet Protocol (IP) networks. For example, telephone exchanges may be interconnected via IP networks for the purpose of carrying both signalling and user voice and data information.

Subscriber telephone terminals in a Public Switched Telephone Network (PSTN) are generally connected to which provide for duplex (i.e. bidirectional) communication. A so-called "hybrid" located at the local exchange converts the bidirectional voice signals from the two-wire lines into unidirectional signals for transmission over four-wire lines used in the inter-exchange trunk connections. Imperfections in the hybrids may allow leakage of signals back to a speaker's telephone from where the signals originated, giving rise to the perception of an echo.

In conventional networks, the problem of echo is reduced by including an echo cancellation device in a telephone circuit if the propagation delay over the circuit exceeds some predefined period (e.g. 15 msec). As the route taken by a telephone circuit is not always predefined, the first exchange in the circuit identifies the "statically" defined delay for next leg and forwards this to the exchange at the end of that leg. The receiving exchange then appends the delay for the next leg to the already accumulated delay and forwards this to the next exchange and so on. When the accumulated delay exceeds the predefined period, a backward message is sent to the originating exchange asking for an incoming or outgoing echo cancellation device to be included in the circuit.

The above process works because in conventional telephone circuits, which use circuit switched traffic channels, the propagation delay over a circuit leg can be predicted with great accuracy. The proposal to transmit telephone voice data between exchanges using a packet switched network upsets this situation as by its very nature packet switched circuits are unpredictable. Unpredictability arises both because a packet may be transmitted between two end points by one of several different routes and because the network uses only a "best effort" to transmit a packet, i.e. if the network is busy a packet may have to wait or may indeed be lost. The propagation delay over a circuit link provided by a packet switched network cannot therefore be statically defined.

SUMMARY OF THE PRESENT INVENTION

It is an object of the present invention to overcome or at least mitigate the above noted disadvantages of using packet switched networks in telecommunication networks. It is a further object of the present invention to provide a telecommunication network in which the propagation delay for voice data sent over a packet switched network can be dynamically determined for the purposes of echo cancellation.

According to a first aspect of the present invention there is provided a method of determining the propagation delay over a packet switched network intended to provide a segment of a telephone circuit for carrying information between at least two subscriber terminals, the method comprising:

reacting to a request for a telephone circuit between said two subscribers by transmitting a packet containing an echo request message over the packet switched network from a first network node to a second network node;

reacting to receipt of the echo request message at the second network node by transmitting a packet containing an echo reply message over the packet switched network from the second network node to the first network node; and and determining the round trip propagation delay for the packet switched network segment on the basis of the time which elapses between sending the echo request message from the first node and receiving the echo reply message also at the first node.

Preferably, the propagation delay for the packet switched network segment is determined prior to the sending of an Initial Address Message (IAM) over the packet switched network segment. More preferably, the determined round trip delay is appended or added to delays determined for preceding circuit segments defined in the IAM, for transmission over the packet switched network.

Preferably, the method described above is employed with an IP network.

According to a second aspect of the present invention there is provided apparatus for determining the propagation delay over a packet switched network intended to provide a segment of a telephone circuit for carrying information between at least two subscriber terminals, the apparatus comprising:

a first packet switched network node coupled between a first subscriber and the packet switched network and arranged to react to a request for a telephone circuit between said two subscribers by transmitting a packet containing an echo request message over the packet switched network to a second packet switched network node;

the second node being arranged to react to receipt of the echo request message by transmitting a packet containing an echo reply message over the packet switched network to the first network node; and processing means associated with the first network node arranged to determine the round trip propagation delay for the packet switched network segment on the basis of the time which elapses between sending the echo request message from the first node and receiving the echo reply message also at the first node.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
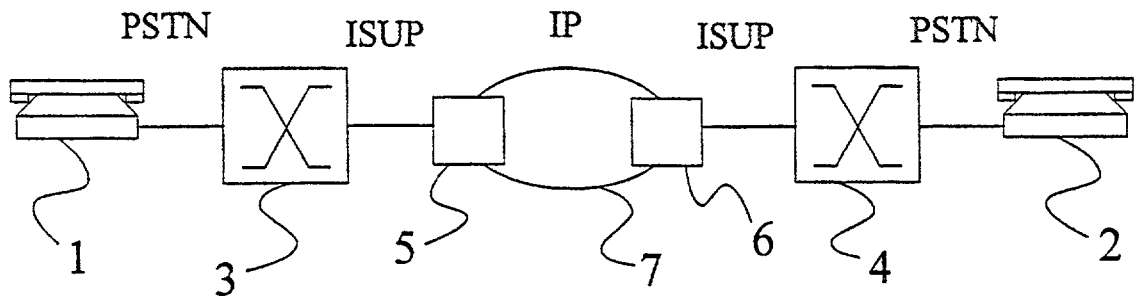
FIG. 1 shows schematically a telecommunications system incorporating an IP network.

There is illustrated in FIG. 1 a telephone system in which a pair of subscriber telephone terminals 1,2 are connected to respective local access exchanges 3,4 via PSTN access networks. The access exchanges 3,4 are in turn connected to respective IP gateway nodes 5,6 via an ISUP (ISDN User Part) interface. Interconnection between the gateway nodes 5,6 is provided via an IP network 7 which may be the Internet or, as is more likely, a closed network employing the TCP/IP protocol.

It will be appreciated that the example shown in FIG. 1 is greatly simplified and the system may include one or more transit exchanges connecting the local access exchanges 3,4 to the IP gateway nodes 5,6. Moreover, the connection between the subscriber terminals 1,2 and the access exchanges 3,4 may be made via one or more intermediate "routers". It will also be appreciated that the IP network 7 comprises a number of interconnected routers such that the path taken by a packet between the two gateway nodes 5,6 may vary under different circumstances.

Full details of a typical call set-up procedure in a PSTN will not be given here. Rather, the reader is referred to for example to "Understanding Telecommunications", Studentlitteratur, Sweden (ISBN 91-44-00214-9). For the purpose of the present discussion it is sufficient to note that after an access exchange 3 receives a B-number dialled by a subscriber telephone 1, interexchange signalling takes place over the ISUP interface to establish a telephone circuit for the requested call.

In the example of FIG. 1, an Initial Address Message (IAM) requesting allocation and reservation of a circuit is passed from the access exchange 3 to the gateway node 5. This IAM identifies the destination exchange 4, from which the gateway node 5 determines that the next leg of the circuit extends over the IP network 7 to the second gateway node 6. The originating side gateway node 5 formulates an Echo Request message and transmits this over the IP network 7 to the terminating side gateway node 6, which responds by returning an Echo Reply message. On the basis of the time elapsed between transmitting the Echo Request message and receiving the Echo Reply message the originating side gateway node 5 is able to determine the round trip propagation delay for a data packet under the current IP network conditions.

The determined propagation delay is then appended to any accumulated delays already included in the IAM received by the originating side gateway 5 from the access exchange 3 (e.g. the round trip propagation delay between the access exchange 3 and the gateway node 5). The modified IAM is then sent over the IP network 7 to the terminating side gateway node 6 where the (static) round trip propagation delay for the link between that gateway node 6 and the terminating side exchange 4 is further appended to the IAM contained delay. The IAM can then be passed to the terminating exchange 4. Following the establishment of the complete telephone circuit, an Address Complete Message (ACM) is returned from the terminating exchange 4 to the originating exchange 3, the message containing the total accumulated propagation delay.

A decision on whether to introduce an incoming or outgoing echo cancellation device into the telephone circuit may be made at the originating exchange 3 on the basis of accumulated propagation delay returned in the ACM. Alternatively, an echo cancellation device may be introduced at the terminating side access exchange 4.

Figure 2:
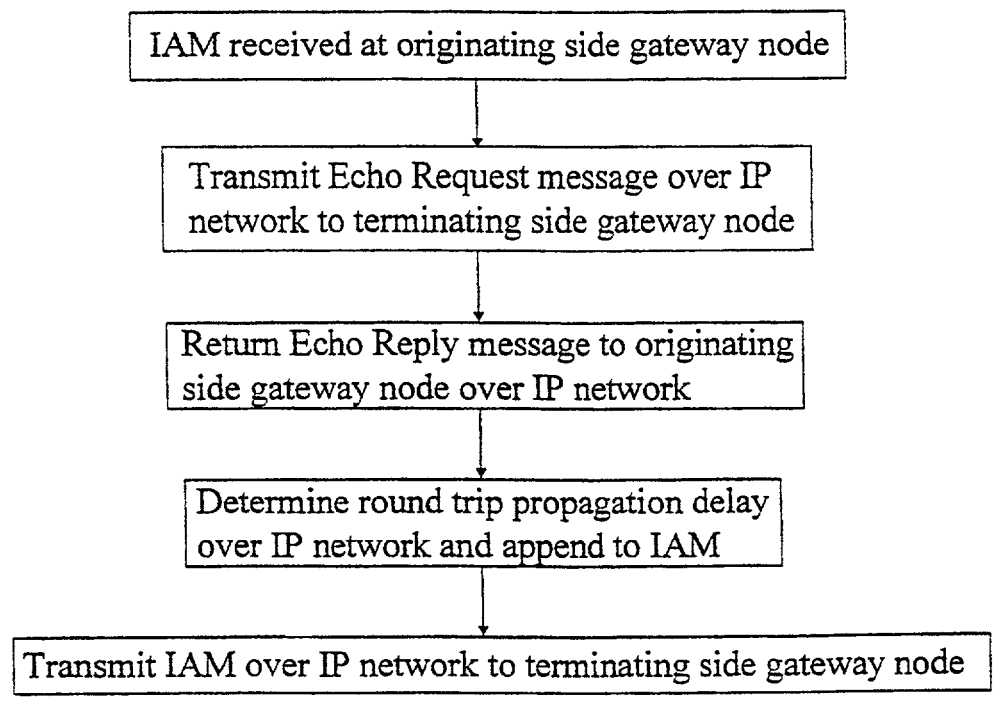
FIG. 2 is a flow diagram showing a part of a call set-up phase in the system of FIG. 1.

FIG. 2 illustrates further the steps involved in calculating the round trip propagation delay at the originating side gateway node 5.

It will be appreciated by the person of skill in the art that modifications may be made to the above described embodiment without departing from the scope of the present invention. For example, whilst the above description has been concerned with the use of an IP network, the invention is applicable to any suitable packet switched network.

What is claimed is:

1. A method for improving the quality of a voice call through a router controlled IP network that provides a segment of a telephone circuit for carrying information between at least two subscriber terminals, the method comprising:

reacting to a request for a telephone circuit between said two subscribers by transmitting a voice packet containing an echo request message over the router controlled IP network from a first network node to a second network node;

reacting to receipt of the echo request message at the second network node by transmitting a voice packet containing an echo reply message over the router controlled IP network from the second network node to the first network node;

determining a round trip propagation delay for the router controlled IP network segment on the basis of the time which elapses between sending the echo request message from the first node and receiving the echo reply message also at the first node; and, introducing an echo cancellation mechanism into the IP network, as a function of said round trip propagation delay, prior to establishing said voice call.

2. A method according to claim 1 and comprising determining the propagation delay for the router controlled IP network segment prior to the sending of an Initial Address Message (IAM) over the router controlled IP network segment.

3. A method according to claim 2 and comprising appending or adding the determined round trip delay to delays determined for preceding circuit segments and defined in the IAM, for transmission over the router controlled IP network.

4. A system for determining the improving the quality of a voice call through a router controlled IP network that provides a segment of a telephone circuit for carrying information between at least two subscriber terminals, the system comprising:

a first router controlled IP network node coupled between a first subscriber and the router controlled IP network and arranged to react to a request for a telephone circuit between said two subscribers by transmitting a voice packet containing an echo request message over the router controlled IP network to a second router controlled IP network node;

the second node being arranged to react to receipt of the echo request message by transmitting a voice packet containing an echo reply message over the router controlled IP network to the first network node;

processing means associated with the first network node arranged to determine a round trip propagation delay for the router controlled IP network segment on the basis of the time which elapses between sending the echo request message from the first node and receiving the echo reply message also at the first node; and, an echo cancellation mechanism couplable to the segment of a telephone circuit, as a function of said round trip propagation delay, prior to establishing said voice call through said segment.

* * * * *